United States Patent [19]

Inoue et al.

[11] Patent Number: 4,652,138
[45] Date of Patent: Mar. 24, 1987

[54] SINGLE SCREW KNEADING EXTRUDER

[75] Inventors: Kimio Inoue; Shinichi Fukumizu; Akiro Fusamoto, all of Kobe, Japan

[73] Assignee: Kabushiki Kaisha Kobe Seiko Sho, Hyogo, Japan

[21] Appl. No.: 744,001

[22] PCT Filed: Oct. 30, 1984

[86] PCT No.: PCT/JP84/00519
§ 371 Date: May 24, 1985
§ 102(e) Date: May 24, 1985

[87] PCT Pub. No.: WO85/01911
PCT Pub. Date: May 9, 1985

[30] Foreign Application Priority Data

Nov. 2, 1983 [JP] Japan ............................. 58-207202

[51] Int. Cl.[4] ............................................. B29B 1/10
[52] U.S. Cl. ........................................ 366/89; 366/90; 366/322; 366/323
[58] Field of Search ................ 366/79, 81, 89, 90, 366/318, 319, 322-324; 425/204, 208, 209

[56] References Cited

U.S. PATENT DOCUMENTS

| 2,607,077 | 8/1952 | Dulmage | 366/82 |
| 3,788,614 | 1/1974 | Gregory | 366/82 |
| 3,825,236 | 7/1974 | Hussmann et al. | 366/89 X |
| 3,957,256 | 5/1976 | Murakami | 366/81 |
| 4,074,362 | 2/1978 | Kruder et al. | 366/82 |
| 4,154,536 | 5/1979 | Sokolow | 366/90 |
| 4,514,163 | 4/1985 | Nakamura | 366/90 X |

Primary Examiner—Timothy F. Simone
Attorney, Agent, or Firm—Oblon, Fisher, Spivak, McClelland & Maier

[57] ABSTRACT

A single screw kneading extruder adapted for use with a viscous fluid such as molten plastics and including a first-stage kneading portion (2) and a second-stage kneading portion (4) aligned therewith. The first kneading portion (2) disperses a filler in polymer by a powerful shearing force and has kneading blades (12) on its rotor (10). The filler incorporated into the polymer by the first portion (2) is uniformly blended with and dispersed in the polymer by the second kneading portion (4) having cavities (23), (22) in its rotor (21) and stator (20), respectively.

10 Claims, 6 Drawing Figures

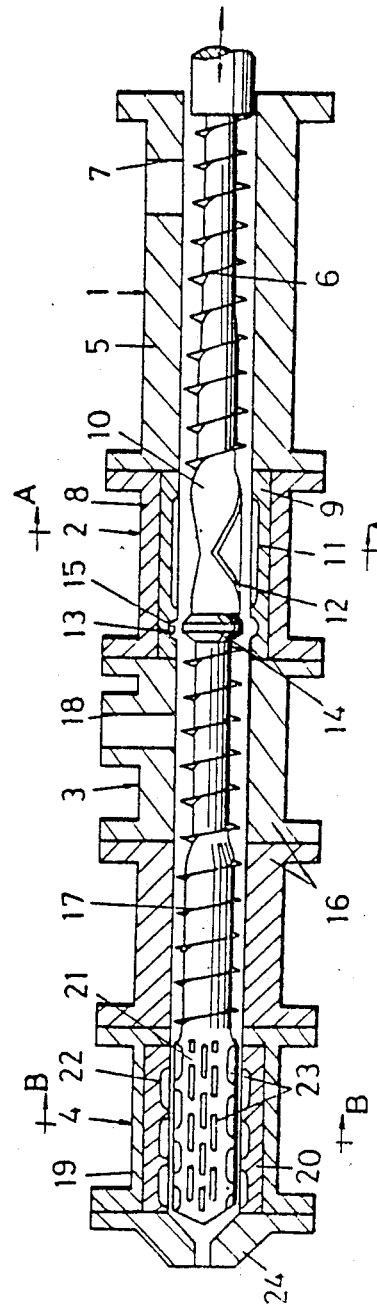
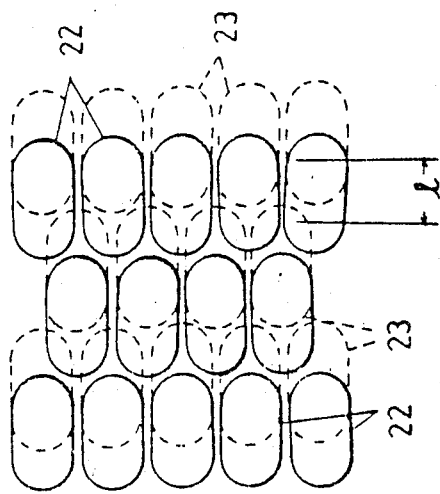
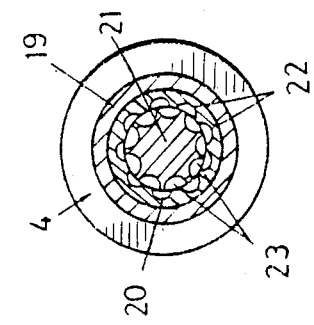
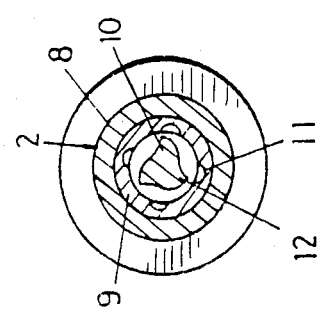

SINGLE SCREW KNEADING EXTRUDER

TECHNICAL FIELD

The present invention relates to a single screw kneading extruder for performing both a kneading action and a blending action.

BACKGROUND ART

Published Unexamined Japanese Patent Application No. SHO 57-87344 is known and proposes an extrusion mixer comprising a rotor and a stator which are formed with semispherical cavities. The extrusion mixer (hereinafter referred to as "CTM") is so adapted that a fluid, while passing over the cavities, is subjected to a uniform blending action by being cut and sheared owing to the movement of the fluid from cavity to cavity and to the rotation of the rotor. Accordingly, the mixer exhibits remarkable blending and dispersing ability, for example, when preparing a compound from molten polyethylene and a carbon master batch composed similarly of polyethylene and carbon black dispersed therein in high concentration by uniformly blending the master batch with the melt, or when preparing a polymer blend from at least two kinds of molten polymers, which are different in flowability, by uniformly blending the melts together.

With the CTM, however, it is extremely difficult to obtain a homogeneous dispersion by blending a filler, such as carbon black or calcium carbonate, directly with polyolefin, because carbon black, calcium carbonate or like powder flows into the cavities before being fully kneaded into the polymer, filling up the cavities and rendering the machine inoperative for blending action. Further in order to knead agglomerates of particles into the polymer to obtain a uniform dispersion, the agglomerates must be broken down by shearing forces, but the shearing force acting on the fluid within the CTM is small and insufficient to break down the agglomerates of particles.

When mixing particles with a polymer to obtain a blend which is uniform on a microscale, the materials needs to be crushed or mashed by a shearing force, suitably with use of a mixer or kneader having such crushing or mashing action. It is well known that machines, such as Banbury mixers, in which the charge is crushed in a wedge-shaped space, are suitable for this purpose.

SUMMARY OF THE INVENTION

In view of the above, the present invention provides a single screw kneading extruder which, although a single machine, is adapted to perform the outstanding blending action of the CTM and the action to be typically afforded by a Banbury mixer to knead powdery additives of the like by a powerful shearing force.

The present invention provides a single screw kneading extruder having a kneading portion comprising a rotor and a stator surrounding the rotor, the kneading extruder being characterized in that it comprises a first-stage kneading portion having a rotor provided with kneading blades, a second-stage kneading portion aligned with the first-stage kneading portion and having a rotor and a stator each formed with cavities, and a feed portion interconnecting the two kneading portions for feeding a blend from the first-stage kneading portion to the second-stage kneading portion. Accordingly, the first-stage kneading portion affords an outstanding kneading action with the kneading blades which are tipped, while the second-stage kneading portion provides an outstanding blending action by the cavities formed in its rotor and stator, thus enabling the extruder to act efficiently for kneading and blending although it is a single machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a sectional view schematically showing an embodiment of the present invention;

FIG. 2 is a view in section taken along the line A—A in FIG. 1;

FIG. 3 is a view in section taken along the line B—B in FIG. 1;

FIG. 4 is a diagram showing an arrangement of cavities; and

BEST MODE OF CARRYING OUT THE INVENTION

Figure 5:
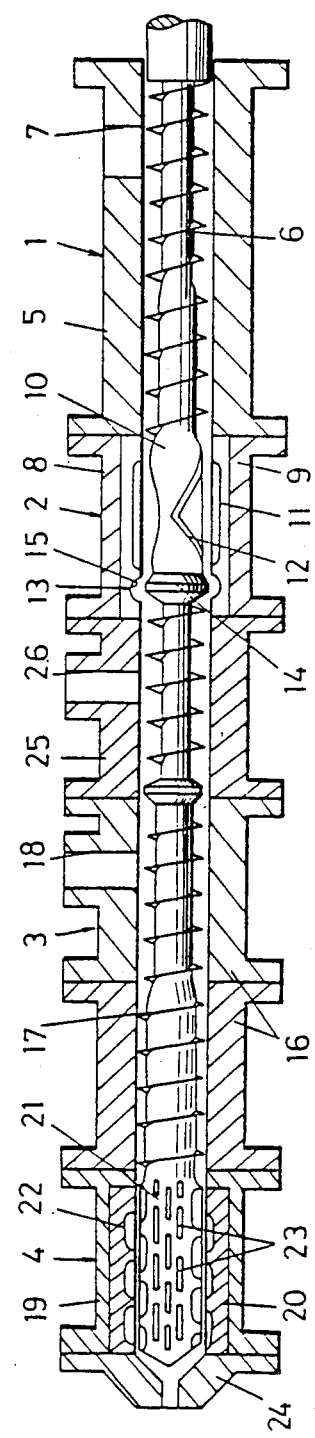
FIG. 5 and FIG. 6 are sectional views schematically showing other embodiments.

The present invention will be described below in detail with reference to the illustrated embodiments. Referring to FIG. 1 to FIG. 3, indicated at 1 is a first-stage feed portion, at 2 a first-stage kneading portion, at 3 a second-stage feed portion, and at 4 a second-stage kneading portion. These portions are arranged in series axially in alignment. The first-stage feed portion 1 comprises a cylinder 5 and a screw 6, and the cylinder 5 has a feed inlet 7. The first-stage kneading portion 2 comprises a cylinder 8, a stator 9 and a rotor 10. The stator 9 is formed with axial grooves 11 for preventing the material from slipping, while the rotor 10 is provided with kneading blades 12 each having a tipped end. Toward the second-stage feed portion 3, the first-stage kneading portion 2 has constriction adjusting means 13. The constriction adjusting means 13 comprises a protrusion 14 formed on the rotor 10 and a circumferential groove 15 formed in the stator 9. The resistance to the flow of material is adjustable by axially moving the rotor 10. The second-stage feed portion 3 comprises a cylinder 16 and a screw 17. The cylinder 16 is formed at an upstream portion with a vent 18 for releasing water, air or the like. The second-stage kneading portion 4 comprises a cylinder 19, a stator 20 and a rotor 21. As seen in FIG. 4, the stator 20 and the rotor 21 have many cavities 22 and 23 formed therein, respectively, in a staggered arrangement. The cavities 22, 23 are axially oblong, and the parallel sides of each oblong cavity 22 or 23 have a length l which is greater than the allowance of adjustment by the constriction adjusting means 13, i.e. the amount of axial movement of the rotor 10. The screws 6, 17 and the rotors 10, 21 are provided on a single shaft. A die 24 is provided at the downstream end of the second-stage kneading portion 4.

The operation of the machine described above will be described next. When charged in through the feed inlet 7, a polymer and carbon black or like filler are forwarded to the first-stage kneading portion 2 by the screw 6 of the first-stage feed portion 1. During feeding of the polymer, the cylinder 5 of the first-stage feed portion 1 is heated or cooled from outside by device (not shown) to feed the polymer to the first-stage kneading portion 2 at a temperature suitable for shearing. In the first-stage kneading portion 2, the rotor 10 having the tipped kneading blades 12 is rotated to exert a powerful shearing action on the materials, consequently melting the polymer and dispersing the filler into the polymer within a shorter period of time than with conventional screws. The rotor 10 can therefore be shorter than conventional screws. On the other hand, the cylinder 8 of the first-stage kneading portion 2 is also heated or cooled by an device (not shown), and the constriction adjusting means 13 downstream therefrom provides a pre-adjusted amount of constriction, so that the kneading temperature for the blend can be controlled by both heating or cooling and the constriction adjustment. Subsequently, the blend is transferred to the second-stage kneading portion 4 by the screw 17 of the second-stage feed portion 3. In the meantime, air, water or the like is released from the blend through the vent 18 by suitably reducing the pressure. On entering the second-stage kneading portion 4, the blend moves forward between the cavities 22 and 23 of the stator 20 and the rotor 21, whereby the filler incorporated into the polymer by the first-stage kneading portion 2 is uniformly blended with and dispersed in the polymer. The blend is thereafter extruded through the die 24. The cavities 22, 23 of the second-stage kneading portion 4 are so arranged that each cavity in one member is opposed to three cavities in the other member. Upon rotation of the rotor 21, therefore, the blend is repeatedly agitated and divided between the cavities 22 and 23. This assures efficient blending. Furthermore because the cavities 22, 23 are oblong, axial movement of the rotors 10, 21 within the allowance of adjustment by the constriction adjusting means 13 will not impair the kneading function.

FIG. 5 shows an embodiment wherein glass fibers are blended with a polymer melted by the first-stage kneading portion 2. Glass fibers are fed through a feed inlet 26 formed in a cylinder 25 of the second-stage feed portion by a forced feeder (not shown), air is released from the glass material through the vent 18 under a reduced pressure, and the fibrous glass material is then uniformly blended with the polymer in the second-stage kneading portion 4. While the second-stage kneading portion 4 has a high ability to blend glass fibers with polymers, this mode of blending glass fibers with a molten polymer serves to mitigate breakage of glass fibers and wear of the machine.

Figure 6:
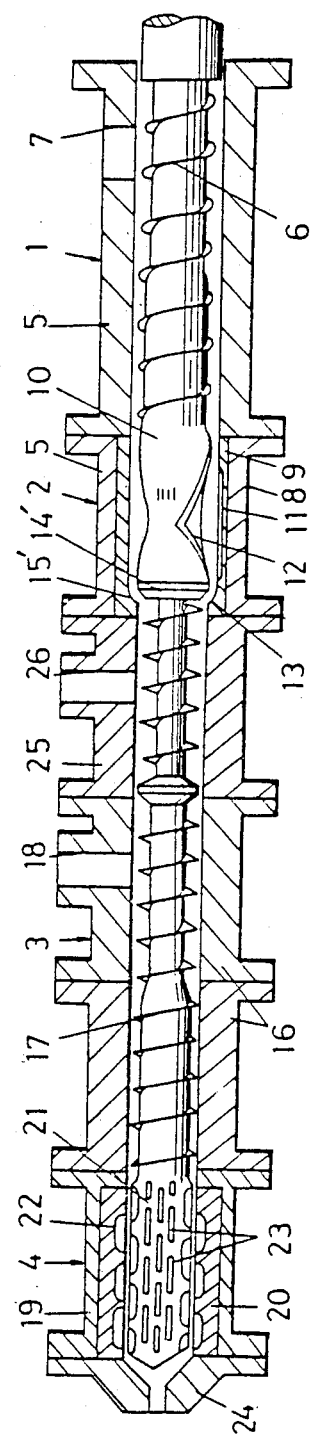

The constriction adjusting means 13 in the first-stage kneading portion 2 need not always be limited to the means 13 shown in FIG. 1 and FIG. 2. As seen in FIG. 6, the rotor 10 of the kneading portion 2 is diametrically enlarged to provide a tapered portion 14', and the cylinder 8 has a tapered portion 15', such that the clearance between the tapered portions is varied by axially moving the rotor 10.

INDUSTRIAL APPLICATION

The single screw kneading extruder of the present invention is suited to use when blending a filler, such as carbon black or calcium carbonate, directly with a polyolefin to obtain a homogeneous dispersion.

We claim:

1. A single screw extruder, which comprises:
   a first-stage feeding portion for forwarding fed materials, comprising a first cylinder and a first screw rotatably provided therein;
   a first-stage kneading portion for dispersively mixing the fed materials, comprising a first cylindrical stator which is coaxially extended from the first cylinder and wherein a first rotor is extended rotatably and coaxially from the first screw so as to define kneading blades;
   constriction adjusting means for controlling a forwarding amount of the materials, provided at outlet of the first-stage kneading portion;
   a second-stage feeding portion for forwarding the materials from the constriction adjusting means, comprising a second cylinder which is coaxially extended from the first stator and wherein a second screw ia provided rotatably and coaxially with the first rotor; and
   a second-stage kneading portion for distributively mixing the materials from the second-stage feeding portion, comprising a second cylindrical stator which is, coaxially extended from the second cylinder, provided with first cavities formed on an inner circumferential surface thereof and wherein a second rotor, rotatably and coaxially extended from the second screw, is provided with second cavities formed on its outer circumferential surface.

2. A single screw kneading extruder as defined in claim 1 wherein the first-stage kneading portion is provided at an inlet side thereof with a feed inlet for feeding materials.

3. A single screw kneading extruder as defined in claim 1 wherein the first stator of the first-stage kneading portion is provided on the inner circumferential surface with axially elongated grooves.

4. A single screw kneading extruder as defined in claim 1 wherein the kneading blades of the first-stage kneading portion have a tipped end.

5. A single screw kneading extruder as defined in claim 1 wherein the constriction adjusting means further comprises means for adjusting clearance between inner surface of the first rotor and outer surface of the first stator by moving the first rotor axially thereof.

6. A single screw kneading extruder as defined in claim 5 wherein the constriction adjusting means further comprises a protrusion formed circumferentially on an outer surface of the first rotor and a circumferential groove formed in inner surface of the first stator.

7. A single screw kneading extruder as defined in claim 1 wherein the second cylinder has a vent formed therein.

8. A single screw kneading extruder as defined in claim 5 wherein the first and second cavities of the second-stage kneading portion are axially elongated and oblong, the oblong cavities having a length greater than the amount of axial movement of the first rotor.

9. A single screw kneading extruder as defined in claim 8 wherein the first and second cavities are in a staggered arrangement.

10. A single screw kneading extruder as defined in claim 1 wherein the second-stage kneading portion further comprises a die positioned at an outlet side thereof.

* * * * *

UNITED STATES PATENT AND TRADEMARK OFFICE
CERTIFICATE OF CORRECTION

PATENT NO. : 4,652,138
DATED : March 24, 1987
INVENTOR(S) : Kimio Inoue, et al

It is certified that error appears in the above-identified patent and that said Letters Patent is hereby corrected as shown below:

The name of third inventor is misspelled.
   It should read:

Akira Fusamoto

Signed and Sealed this
Thirteenth Day of October, 1987

*Attest:*

DONALD J. QUIGG

*Attesting Officer*         *Commissioner of Patents and Trademarks*